United States Patent
Hrbacek et al.

(10) Patent No.: US 9,912,129 B1
(45) Date of Patent: Mar. 6, 2018

(54) APPARATUS FOR TRANSPORTING AND DISPENSING WIRE OR CABLE FROM A BARREL PACK

(71) Applicant: Encore Wire Corporation, McKinney, TX (US)

(72) Inventors: Justin Abraham Hrbacek, Allen, TX (US); John Lamar Rhoads, Jr., McKinney, TX (US); David Wayne Maxey, Gunter, TX (US)

(73) Assignee: Encore Wire Corporation, McKinney, TX (US)

( * ) Notice: Subject to any disclaimer, the term of this patent is extended or adjusted under 35 U.S.C. 154(b) by 339 days.

(21) Appl. No.: 14/097,732

(22) Filed: Dec. 5, 2013

Related U.S. Application Data

(60) Provisional application No. 61/733,766, filed on Dec. 5, 2012.

(51) Int. Cl.
| | |
|---|---|
| *H02G 1/00* | (2006.01) |
| *B65H 49/00* | (2006.01) |
| *G02B 6/46* | (2006.01) |
| *B62B 1/26* | (2006.01) |

(52) U.S. Cl.
CPC .............. *H02G 1/00* (2013.01); *B62B 1/264* (2013.01); *B65H 49/00* (2013.01); *G02B 6/46* (2013.01); *B62B 2202/025* (2013.01)

(58) Field of Classification Search
CPC .. B75H 54/2866; B66C 1/40; B65H 54/2866; B65H 49/32; B65H 49/00; H02G 1/00; B62B 2202/025; B62B 1/264; G02B 6/46
USPC ................. 280/47.19, 47.24; 242/557, 588
See application file for complete search history.

(56) References Cited

U.S. PATENT DOCUMENTS

| | | | | |
|---|---|---|---|---|
| 1,374,379 | A | * | 4/1921 | Klein ...................... B62B 1/264 242/557 |
| 1,510,456 | A | * | 10/1924 | Cadwalader ............ B62B 1/264 248/129 |
| 1,694,343 | A | * | 12/1928 | Klein ...................... B62B 1/264 280/47.12 |
| 2,419,314 | A | * | 4/1947 | McLaren ................ B62B 1/264 248/143 |
| 2,705,114 | A | * | 3/1955 | Worsham ................ B62B 1/264 242/594.4 |
| 2,779,492 | A | * | 1/1957 | Lapham .................. B62B 1/264 280/5.32 |
| 2,797,832 | A | * | 7/1957 | Weinmann .............. B62B 1/264 414/456 |
| 3,134,555 | A | * | 5/1964 | Baker .................... B65H 49/32 242/403.1 |

(Continued)

OTHER PUBLICATIONS

Southwire Company, "Finally, A Real Solution to Reel Problems", SIMpull WireBARREL product information sheet, 2012, 2 pages.

*Primary Examiner* — Michael Gallion
(74) *Attorney, Agent, or Firm* — Warren Rhoades LLP

(57) ABSTRACT

An apparatus for the movement of a barrel pack containing spooled wire or cable. The apparatus comprising a frame, a handle attached to the frame, a plurality of wheels rotatably attached to the frame, securing structures attached to the frame, the securing structures securing the barrel pack to the frame and a footage counting assembly attached to the handle. The footage counting assembly counts the amount of footage of wire or cable passing through the footage counting assembly.

16 Claims, 4 Drawing Sheets

(56) References Cited

U.S. PATENT DOCUMENTS

| | | | | |
|---|---|---|---|---|
| 3,701,491 A | * | 10/1972 | Brown | B65H 67/048 242/474.5 |
| 3,768,751 A | * | 10/1973 | Brown | B65H 54/2866 242/474.5 |
| 3,799,462 A | * | 3/1974 | Fahrbach | H01F 41/08 242/434.9 |
| 3,831,877 A | * | 8/1974 | Bennett | B65H 75/22 242/129 |
| 3,941,399 A | * | 3/1976 | Peters | B62B 1/002 280/47.29 |
| 4,006,865 A | * | 2/1977 | Howard | B65H 49/32 242/388.7 |
| 4,038,805 A | * | 8/1977 | Holladay | B65B 57/10 242/437 |
| 4,106,648 A | * | 8/1978 | Dickson | B62B 3/104 280/47.24 |
| 4,235,362 A | * | 11/1980 | Hubenko | B65H 51/10 140/2 |
| 4,243,468 A | * | 1/1981 | Boyd | E04D 15/06 156/577 |
| 4,635,875 A | * | 1/1987 | Apple | B66D 1/36 242/155 BW |
| 4,773,628 A | * | 9/1988 | Aleshire | H02G 1/086 254/134.4 |
| 4,792,100 A | * | 12/1988 | Pepe | B65H 54/72 242/474.4 |
| 4,896,997 A | * | 1/1990 | Gaylin | E02F 5/102 138/128 |
| 4,974,627 A | * | 12/1990 | Nelson | B65H 75/403 137/355.2 |
| 5,031,276 A | * | 7/1991 | Babb | E03F 9/005 15/104.31 |
| 5,308,012 A | * | 5/1994 | Fuller | B65H 49/321 242/557 |
| 5,433,463 A | * | 7/1995 | Finley | B62B 1/264 280/47.16 |
| 5,947,492 A | * | 9/1999 | Hallberg, Jr. | B62B 1/002 248/98 |
| 5,949,373 A | * | 9/1999 | Eslambolchi | F17D 5/00 342/357.25 |
| 6,086,311 A | * | 7/2000 | Campbell | B62B 1/264 242/571.4 |
| 6,332,738 B1 | * | 12/2001 | Eslambolchi | F16L 1/032 324/509 |
| 6,702,608 B2 | * | 3/2004 | Brennan, Jr. | B25H 3/00 280/47.19 |
| 7,484,684 B2 | * | 2/2009 | Saavedra | B62B 1/26 242/391 |
| 2002/0027178 A1 | * | 3/2002 | Lindermeir | B62B 1/10 242/388.6 |
| 2005/0087943 A1 | * | 4/2005 | Babkes | B62B 1/002 280/30 |
| 2005/0145748 A1 | * | 7/2005 | Anderson | B62B 1/26 242/588 |
| 2010/0181411 A1 | * | 7/2010 | Fernandez | A62C 33/02 242/403 |
| 2011/0108658 A1 | * | 5/2011 | Factor | B62B 1/20 242/594 |
| 2014/0070153 A1 | * | 3/2014 | Lin | B66C 1/40 254/323 |
| 2014/0166270 A1 | * | 6/2014 | Varkey | E21B 41/00 166/250.01 |
| 2015/0259002 A1 | * | 9/2015 | Reddi | B62B 1/002 280/47.18 |
| 2017/0144685 A1 | * | 5/2017 | McVay | B62B 5/049 |

* cited by examiner

APPARATUS FOR TRANSPORTING AND DISPENSING WIRE OR CABLE FROM A BARREL PACK

CROSS-REFERENCE TO RELATED APPLICATIONS

This application claims the benefit of U.S. Provisional Application No. 61/733,766 filed on Dec. 5, 2012, of which the entirety is incorporated herein by reference.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

1. Field of the Invention

This invention relates to an apparatus for transporting and dispensing wire or cable from a barrel pack. More specifically, it relates to an improved hand truck apparatus incorporating a measuring device, guide eyelets, and a grooved, castered wheel that enhances wire or cable dispensing from a barrel pack.

2. Description of Related Art

Wires and cables used in housing and other industrial projects are often stored in drums that have an inner drum upon which the wire is spooled around, and are known in the art as barrel packs. Barrel packs are a common storage unit to package and dispense hundreds of feet of wire or cable. Wire from a barrel pack is often installed in conduit and electrical boxes by being dispensed directly from the barrel pack. The current standard barrel pack design causes problems when wire or cable is being dispensed, particularly when the wire or cable level is low, as the tension in the wire as it is being dispensed can cause a loop of wire or cable to tighten on the barrel's inner drum. The installer can continue to apply tension, but the tight loop on the inner drum will not slide, and the barrel will be dragged or tipped over instead of allowing the wire to be dispensed. Additionally, a barrel pack can weigh up to 650 lbs or more, and is difficult to transport without equipment designed to carry a barrel. Moreover, wire that is packaged in barrel packs does not typically include footage markers printed on the outer surface, and the installer cannot easily keep track of how much footage of wire or cable remains in the barrel.

One solution to the issues related to dispensing wire from a barrel pack has been to include a single eyelet attached to the barrel pack that is placed over the center of the barrel through which the wire is dispensed. When the wire is dispensed in this manner, it is less likely that a loop of wire will tighten against the inner drum of the barrel pack. Another solution provides a similar eyelet, but places it on a hand truck. These solutions, though advantageous over the former, do not facilitate a wide range dispensing angles nor do they act to reduce the effort required for installation. Additionally, they do not allow for an installer to know the amount of wire remaining in the barrel pack.

Therefore, a need exists for an apparatus that prevents wire or cable from binding against an inner drum of a barrel pack and allows an installer to know the amount of wire remaining in the barrel pack, all while reducing the effort required to dispense the wire or cable from the barrel pack.

BRIEF SUMMARY OF THE INVENTION

The present disclosure is directed at an apparatus for transporting and dispensing wire or cable from a barrel pack, including the ability to measure the amount of wire or cable dispensed from the barrel pack. The apparatus according to one disclosed embodiment is a hand truck that includes a plurality of wheels that fully support the barrel pack during transport, structures attached to the hand truck that secure the barrel pack to the hand truck, and a footage counting assembly that attaches to the hand truck. The footage counting attachment may be configured to be adjustable between a dispensing position and a storage position when not in use. The footage counting attachment may have several elements, such as eyelets with ceramic inserts and a grooved, castered wheel, that reduce the risk of damage to the wire or cable as it is dispensed. These elements also reduce the effort required to dispense wire or cable from the barrel pack, and solve problems that the prior art has failed to solve.

BRIEF DESCRIPTION OF THE SEVERAL VIEWS OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown.

In the drawings.

DETAILED DESCRIPTION OF THE INVENTION

Figure 1:
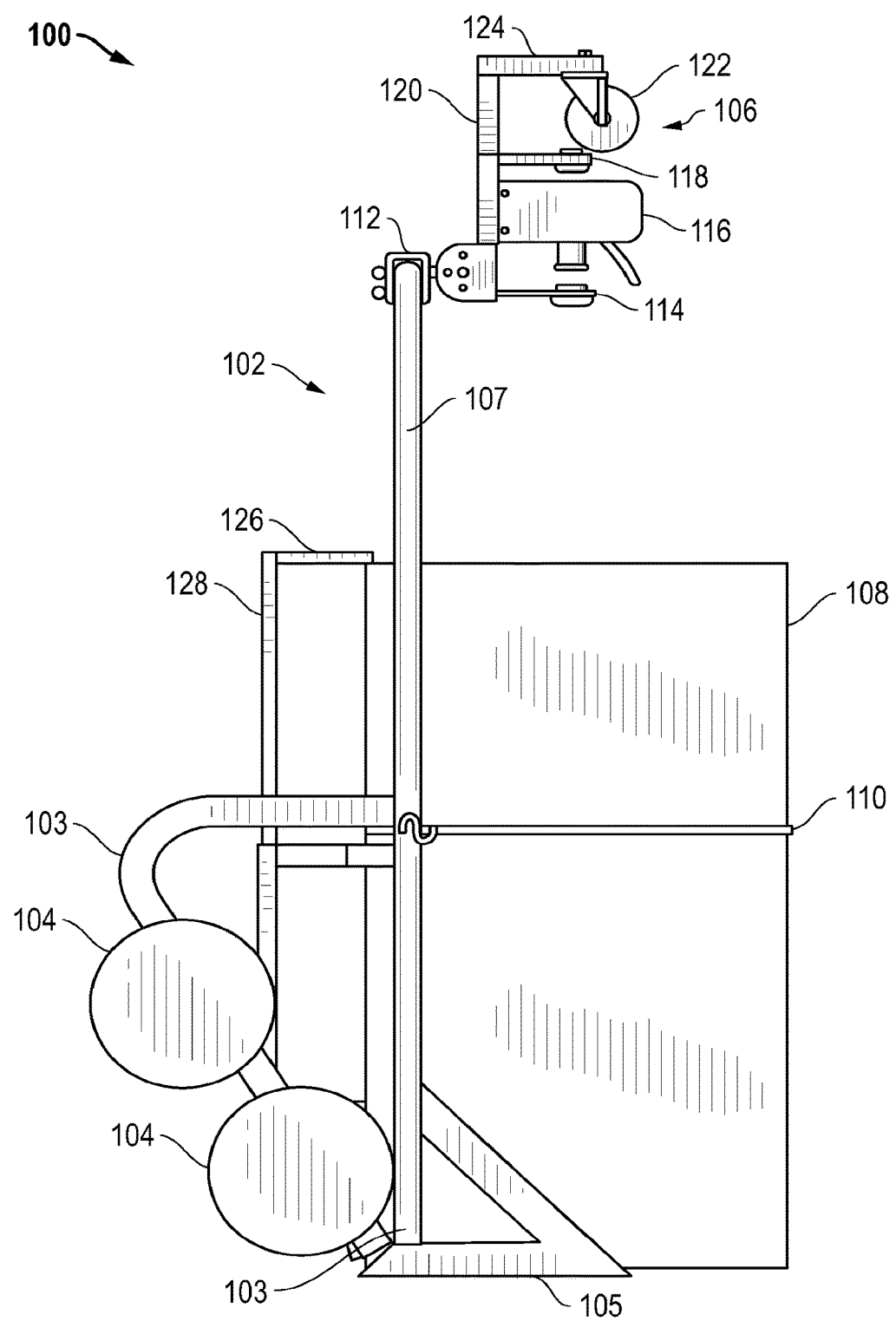
FIG. 1 depicts a side view of one disclosed embodiment of the hand truck engaged with a barrel pack.

Before explaining at least one disclosed embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed are for purpose of description and should not be regarded as limiting.

It should be understood that any one of the features of the invention may be used separately or in combination with other features. Other systems, methods, features, and advantages of the present invention will be or become apparent to one with skill in the art upon examination of the drawings and the detailed description. It is intended that all such additional systems, methods, features, and advantages be included within this description, be within the scope of the present invention, and be protected by accompanying claims.

The present disclosure is described below with reference to the Figures in which various embodiments of the present invention are shown. The subject matter of the disclosure may, however, be embodied in many different forms and should not be construed as limited to the exemplary embodiments set forth herein. It is also understood that the term "wire" is not limiting, and refers to wires, cables, electrical lines, or any other materials that are dispensed from a reel.

Figure 2:
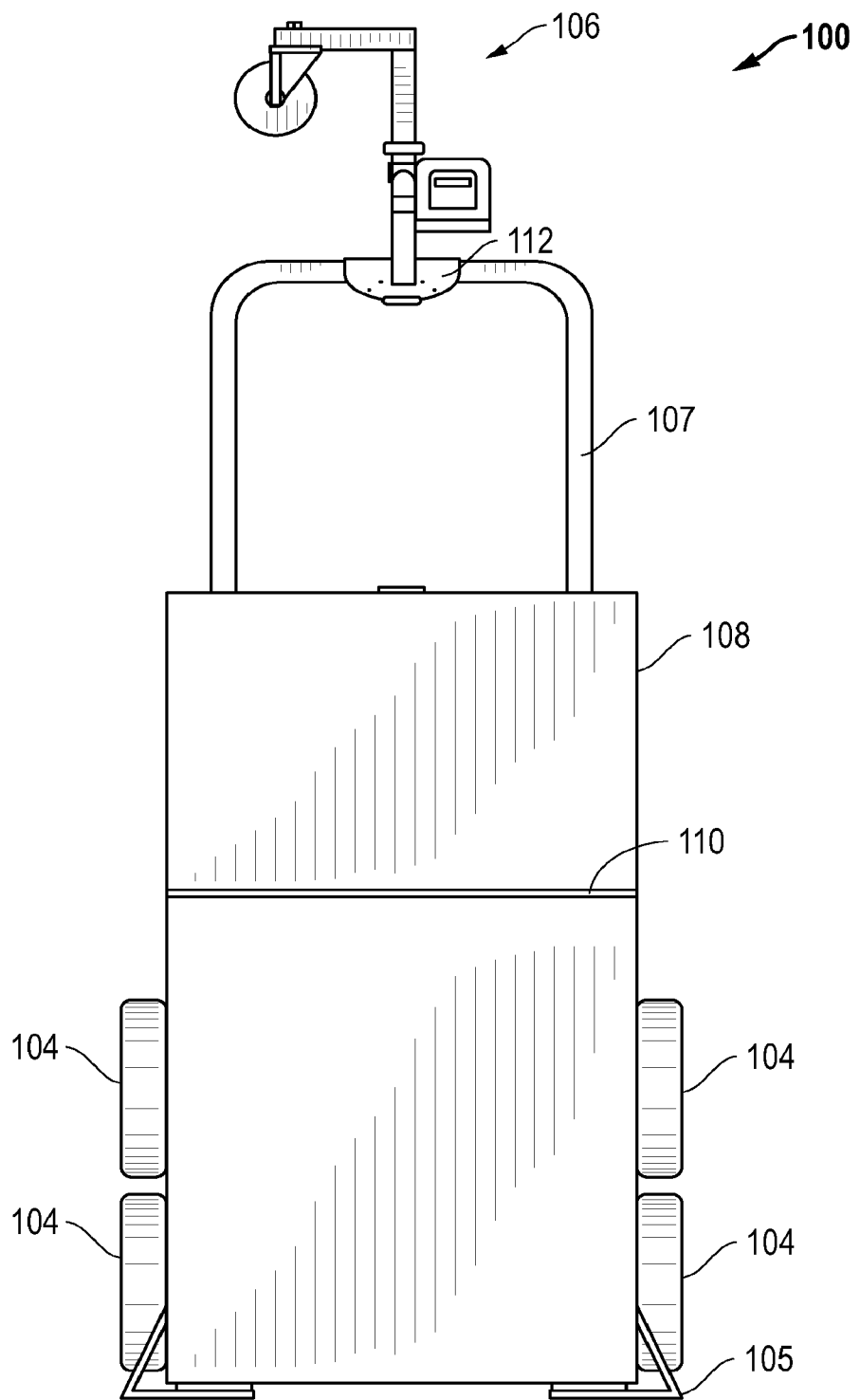
FIG. 2 depicts a front view of one disclosed embodiment of the hand truck engaged with a barrel pack.
Figure 3:
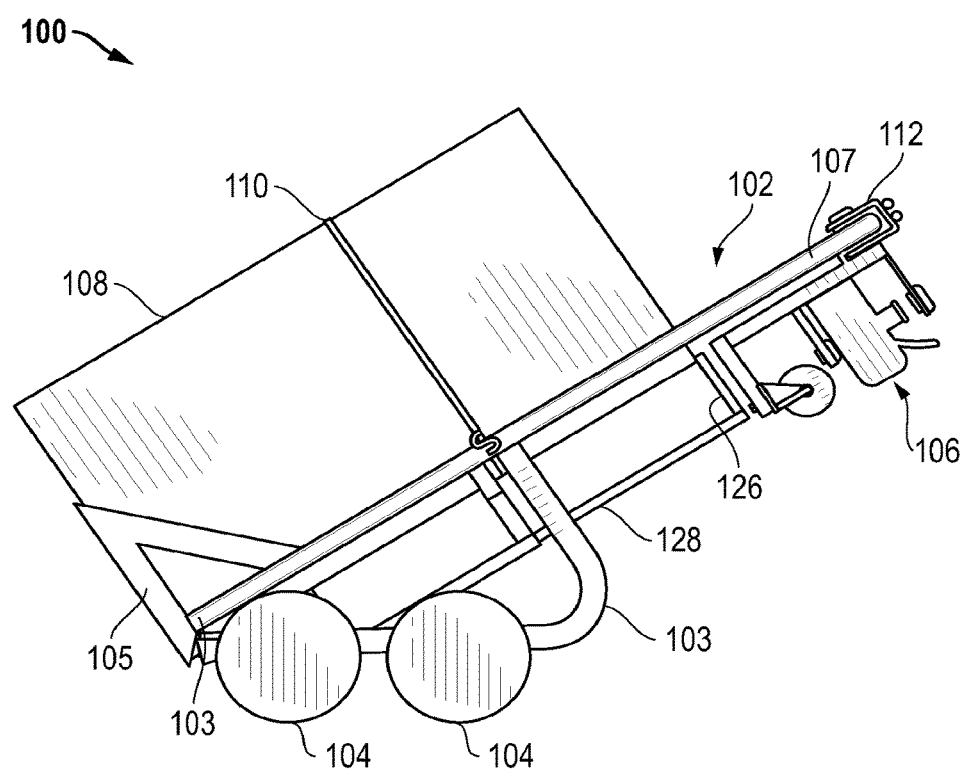
FIG. 3 depicts a side view of one disclosed embodiment of the hand truck engaged with a barrel pack while in a position for transportation of the barrel pack.

The present invention provides for an apparatus for transporting barrel packs of spooled wire, dispensing wire from the barrel pack during installation of the wire, and measuring the amount of wire dispensed during the installation of the wire. A hand truck 100 according to one disclosed embodiment is shown in FIGS. 1-3. The hand truck 100 is formed of a wheeled assembly 102 and footage counting assembly 106. In one disclosed embodiment, the hand truck 100 is made of steel or other materials sufficiently strong to support the weight of a barrel pack filled with wire which often exceeds 600 lbs. It is understood by a person of ordinary skill in the art that a variety of materials can be used to form the hand truck 100 without detracting from the spirit of the invention.

In one disclosed embodiment, the wheeled assembly 102 includes a handle 107 fixedly attached to a frame 103 and four wheels 104 rotatably attached to the frame 103 to improve control and balance during transportation of a barrel pack 108. One of ordinary skill in the art would understand that a variety of wheeled structural designs are available without detracting from the spirit of the invention including, but not limited to, a unitary frame/handle structure and a secondary wheel support apparatus connected to the frame 103. The wheels 104 support the weight of the hand truck 100 and the barrel pack 108, including any wire therein. A supporting base 105 is fixedly attached to the frame 103 and is typically perpendicular to the main axis of the frame 103, however, a wide variety of attachment angles may be implemented without detracting from the spirit of the invention. In one disclosed embodiment, the supporting base is of sufficient size to prevent the barrel pack 108 from being displaced from the hand truck 100 during transportation of the barrel pack 108.

The wheeled assembly 102 secures the barrel pack 108 to the wheeled assembly 102 with an extendable rod 128 and a restraining member 126. The extendable rod 128 is fixedly attached to the frame and the restraining member 126 is fixedly attached to the extendable rod 128. The restraining member 126 contacts the inner portion of the rim of the barrel pack 108, applying lateral and downward pressure such that it prevents the barrel pack 108 from tipping forward. The extendable rod 128 is formed from two tubular members, a first tubular member sized to fit within the second tubular member. An adjustable pressure clamp secures the first tubular member within the second tubular member once a selected height is determined. A wide variety of extendable rod 128 structures are available without detracting from the spirit of the invention. A strap 110 is employed to further secure the barrel pack 108 to the wheeled assembly 102. The strap 110 may be elastic or inelastic, and connects to the frame 103. It is understood by one of ordinary skill in the art that the strap 110 may be composed of any number of materials, including but not limited to rubber, cable, webbing, and rope, and is connected to the frame 103 through a variety of connection devices. The supporting base 105 may be made of the same material as the wheeled assembly 102 or different materials as would be apparent to one having the ordinary skill in the art.

The footage counting assembly 106, in one disclosed embodiment, attaches to the handle 107 of the wheeled assembly 102 through a bracket 112. In one disclosed embodiment, a lower eyelet 114, an upper eyelet 118, and a measuring device 116 are supported by a vertical member 120 that attaches to the bracket 112, securing the footage counting assembly 106 to the wheeled assembly 102. A grooved, castered wheel 122 is attached to a horizontal support member 124 that attaches to the vertical member 120. In another disclosed embodiment, the footage counting assembly 106 rotates to align with the axis of the wire installation path.

Wire or cable spooled in the barrel pack 108 is first fed through the lower eyelet 114 and then into the measuring device 116. The measuring device 116 is of a floating wheel type measuring device well known in the art. As the wire passes through the measuring device 116, a spring creates pressure between the wire and the floating wheel. As the wheel spins, a meter is incremented to show the length of wire that has passed through the measuring device 116. After passing through the measuring device 116, the wire or cable is passed through the upper eyelet 118 to the grooved, castered wheel 122 and then to installation. In one disclosed embodiment, the lower eyelet 114 and upper eyelet 118 align the cable to be fed through the measuring device 116 and allow the cable to be dispensed from the barrel pack 108 without binding. Typically, the lower eyelet 114 and upper eyelet 118 are aligned such that the wire or cable travels a path substantially along the vertical axis of the barrel pack 108. The lower eyelet 114 and upper eyelet 118 are formed from a rounded ceramic insert designed to prevent damage to the wire as it is dispensed through the footage counting assembly 106. It is appreciated by one of ordinary skill in the art that other materials, including but not limited to plastics may form the eyelets. In one disclosed embodiment, the grooved, castered wheel 122 reorients the wire or cable along a direction toward the installation. This reorientation of the wire or cable may be at any angle, including perpendicular, when compared to the vertical axis of the barrel pack 108 and typically the grooved, castered wheels 122 reorients according to the path of the wire installation. The grooved, castered wheel 122 reduces friction during dispensing compared to a regular eyelet as disclosed by the prior art.

Referring now to FIG. 3, a side view of one disclosed embodiment of the hand truck 100 engaged with a barrel pack 108 while in a position for transportation of the barrel pack 108 is disclosed. The hand truck 100 may tip into a moving position in which the four wheels 104 engage the surface and the main axis of the barrel pack 108 forms an acute angle with the surface. Two pairs of wheels 104 allow the hand truck 100 to be moved while supporting the weight of the barrel pack 108 loaded with wire or cable. In this position, the wheels 104 engage the surface, placing the barrel pack 108 in an advantageous position for securing the barrel pack 108 to the hand truck 100.

The footage counting assembly 106, in one disclosed embodiment, is rotatable around the handle 107 through bracket 112 to improve transportation of the barrel pack 108. In this disclosed embodiment, the bracket 112 attaches to the handle 107 through pins that slide through holes in the handle 107 and the bracket 112. It is understood by one having ordinary skill in the art that the implementation of the various rotatable attachment structures available to attach the footage counter assembly 106 to the handle 107 does not detract from the spirit of the invention. The footage counting assembly 106 may be rotated to a position within the handle 107 during transportation or replacement of the barrel pack 108 as is shown in FIG. 3. The footage counting assembly can be rotated to its original position when the wire or cable is ready for installation at the work site.

Figure 4:
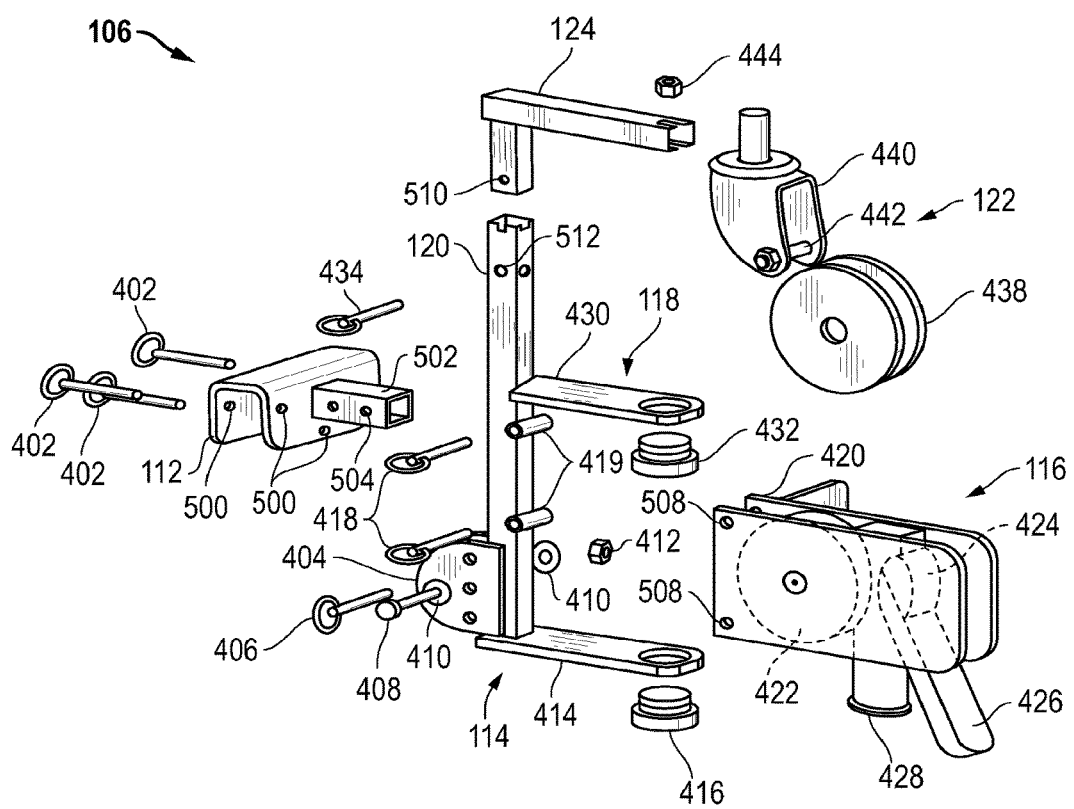
FIG. 4 depicts an exploded view of the footage counting assembly of one disclosed embodiment of the present invention.

Referring now to FIG. 4, an exploded view of one disclosed embodiment of the footage counter assembly 106 is disclosed. The bracket 112 attaches to the wheeled assembly 102 through a plurality of pins 402 and pin holes 500. The bracket 112 includes a member 504, substantially perpendicular to the handle 107 of the wheeled assembly 102, and is attached to the vertical member 120 through a supporting bracket 404 and secured to the member 504, through holes 500, by a pin 406 and a screw 408, washers 410, and a nut 412. The vertical member 120 is fixedly attached to an eyelet bar 414 which includes the lower eyelet 114. The eyelet bar 414 includes a circular void which receives an insert 416 to form the lower eyelet 114. The insert 416 may be made of a ceramic or other suitable material so that the wire is not damaged as it passes through or contacts the insert 416. The vertical member 120 is fixedly attached to an upper eyelet bar 430 which includes the upper eyelet 118. The upper eyelet bar 430 includes a circular void which receives an insert 432 to form the upper eyelet 118. The insert 432 may be formed of the same materials as insert 416.

The footage counter assembly 106 includes the measuring device 116. The measuring device 116 includes a housing 420 which houses a large wheel 422, a small wheel 424, a measuring display bar 426, and a flared opening 428. When wire or cable is being dispensed, the wire passes through the flared opening 428 where it is contacted by the large wheel 422 and small wheel 424. The large wheel 422 and small wheel 424 are held against the wire such that as the wire moves between them, the wire causes both the large wheel 422 and small wheel 424 to spin, without slipping. The small wheel 424 is of an accurately known circumference such that based on the number of revolutions of the small wheel 424, it can be determined how many linear units of wire has been dispensed and displayed on the measuring display bar 426. The measuring device 116 is attached the vertical member 120 and its hollowed tubes 419 by two pins 418 that slide through the hollowed tubes 419 and holes 508 in the housing 420 of the measuring device 116.

The horizontal support member 124 attaches at a substantially perpendicular angle to the vertical member 120 to support the grooved, castered wheel 122. The horizontal support member 124 is formed in an "L" shape and includes holes 510 which align with holes 512 of the vertical member 120. A portion of the horizontal support member 124 is inserted into the vertical member 120 and pin 434 is inserted through holes 510 and holes 512 when aligned, fixedly attaching the horizontal support member 124 to the vertical member 120. The grooved, castered wheel 122 includes a grooved wheel 438 that is attached to a caster 440 by a screw 442. The grooved, castered wheel is attached to the horizontal member 124 by a nut 444 that screws on to the post of the caster 440.

One skilled in the art will recognize that different embodiments may be formed in a similar manner having different characteristics depending on the need, performance, or some other criteria. It will thus be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

What is claimed is:

1. An apparatus for the movement over a surface of a barrel pack containing spooled wire or cable, the apparatus comprising:
   a frame;
   a handle attached to the frame;
   a base attached to the frame, wherein the barrel pack rests on the base;
   at least three wheels rotatably attached to the frame;
   securing structures attached to the frame, the securing structures securing the barrel pack to the frame;
   a footage counting assembly attached to the handle, wherein the footage counting assembly counts the amount of footage of wire or cable passing through the footage counting assembly;
   wherein the at least three wheels contact the surface during movement of the apparatus; and
   wherein the base does not contact the surface during movement of the apparatus and does contact the surface during installation of the spooled wire apparatus and the barrel pack stands upright during installation of the spooled wire or cable; wherein the footage counting assembly further comprises:
   a vertical member attached to the handle;
   a lower eyelet attached to the vertical member;
   an upper eyelet attached to the vertical member; and
   a measuring device attached to the vertical member and located between the lower and upper eyelets;
   a horizontal member attached to the vertical member;
   a castered wheel attached to the horizontal member, wherein the castered wheel interacts with the wire or cable;
   wherein the castered wheel is located above the upper eyelet and the lower eyelet.

2. The apparatus of claim 1 wherein the at least three wheels includes at least four wheels.

3. The apparatus of claim 2 wherein the at least four wheels allows the barrel pack to be tilted during movement.

4. The apparatus of claim 1 wherein the at least three wheels are not in contact with the surface during the installation of the spooled wire or cable.

5. The apparatus of claim 1 wherein the footage counting assembly is rotatably attached to the handle.

6. The apparatus of claim 5 wherein the footage counting assembly is located substantially along a vertical axis of the barrel pack during wire or cable installation.

7. The apparatus of claim 5 wherein the footage counting assembly is located within an area defined by the frame and the handle during transportation of the barrel pack.

8. The apparatus of claim 1 wherein the lower and upper eyelets are located substantially along the path of the barrel pack during wire or cable installation.

9. The apparatus of claim 1 wherein the castered wheel is located substantially along a vertical axis of the barrel pack during wire or cable installation.

10. The apparatus of claim 1 wherein the castered wheel is a grooved, castered wheel.

11. The apparatus of claim 1 wherein the wire or cable for installation is transformed from a substantially vertical axis to a substantially horizontal axis.

12. The apparatus of claim 1 wherein the wire or cable exiting the castered wheel is on a different axis from the wire or cable entering the castered wheel.

13. A cable or wire installation system comprising:
   a container containing wire or cable;

a hand truck for transporting the container over a surface, the hand truck further comprising:
a frame;
a handle attached to the frame;
a base attached to the frame, wherein the container rests on the base;
at least three wheels rotatably attached to the frame;
securing structures attached to the frame, the securing structures securing the container to the frame;
a footage counting assembly attached to the handle, wherein the footage counting assembly counts the amount of footage of wire or cable passing through the footage counting assembly;
wherein the wire or cable is pulled from the container, through the footage counting assembly, for installation, along a wire installation path axis;
wherein the at least three wheels contact the surface during movement of the hand truck; and
wherein the base does not contact the surface during movement of the hand truck and does contact the surface during installation of the spooled wire apparatus and the container stands upright during installation of the wire or cable wherein the footage counting assembly further comprises:
a vertical member attached to the handle;
a lower eyelet attached to the vertical member;
an upper eyelet attached to the vertical member;
a measuring device attached to the vertical member and located between the lower and upper eyelets;
a horizontal member attached to the vertical member at substantially 90 degrees; and
a castered wheel attached to the horizontal member, wherein the castered wheel interacts with the wire or cable;
wherein the castered wheel is located above the upper eyelet and lower eyelet.

14. The installation system of claim 13 wherein the wire or cable is pulled from the container, through the footage counting assembly and through the castered wheel, for installation.

15. The installation system of claim 14 wherein the castered wheel rotates to substantially align the wire or cable with the axis of the wire installation path.

16. The installation system of claim 14 wherein the castered wheel is located substantially along a vertical axis of the container during wire or cable installation.

* * * * *